United States Patent
Weber et al.

(10) Patent No.: US 10,969,500 B2
(45) Date of Patent: Apr. 6, 2021

(54) METHOD FOR DETERMINING AN AZIMUTH ANGLE OF A WIND TURBINE

(71) Applicant: Wobben Properties GmbH, Aurich (DE)

(72) Inventors: Marcel Weber, Aurich (DE); Marc Jandl, Mainz (DE)

(73) Assignee: Wobben Properties GmbH, Aurich (DE)

( * ) Notice: Subject to any disclaimer, the term of this patent is extended or adjusted under 35 U.S.C. 154(b) by 374 days.

(21) Appl. No.: 16/061,997

(22) PCT Filed: Dec. 15, 2016

(86) PCT No.: PCT/EP2016/081259
§ 371 (c)(1),
(2) Date: Jun. 13, 2018

(87) PCT Pub. No.: WO2017/102986
PCT Pub. Date: Jun. 22, 2017

(65) Prior Publication Data
US 2018/0372886 A1  Dec. 27, 2018

(30) Foreign Application Priority Data

Dec. 17, 2015 (DE) ..................... 10 2015 122 126.8

(51) Int. Cl.
*G01S 19/53* (2010.01)
*F03D 7/02* (2006.01)
(Continued)

(52) U.S. Cl.
CPC ............ *G01S 19/53* (2013.01); *F03D 7/0212* (2013.01); *G01S 19/14* (2013.01); *G01S 19/42* (2013.01);
(Continued)

(58) Field of Classification Search
CPC .......... G01S 19/53; G01S 19/14; G01S 19/42; G01S 19/235; G01S 19/35; G01S 19/07;
(Continued)

(56) References Cited

U.S. PATENT DOCUMENTS 7,003,386 B1   2/2006  Ericsson et al.
7,139,662 B2  11/2006  Ericsson et al.
(Continued)

FOREIGN PATENT DOCUMENTS

DE  202007008066 U1  11/2008
DE  102012108573 A1   3/2014
(Continued)

*Primary Examiner* — Harry K Liu
(74) *Attorney, Agent, or Firm* — Seed IP Law Group LLP

(57) ABSTRACT

A method for determining an azimuth angle of a wind power installation is provided. The method includes attaching at least two global navigation satellite system (GNSS) receivers to a nacelle, comparing reception signals of the GNSS receivers, deriving the azimuth angle from the comparison. The at least two GNSS receivers may be attached to a wind measuring supporting frame. Provided is a method including attaching a telescopic sight to a nacelle, determining a bearing of a bearing object at a bearing angle, deriving the azimuth angle from a comparison of the bearing angle with coordinates of the bearing object and/or the wind power installation. The telescopic sight may be attached to a wind measuring supporting frame. The at least one GNSS receiver may be attached to a wind measuring supporting frame. A wind power installation is also provided.

13 Claims, 13 Drawing Sheets

(51) Int. Cl.
*G01S 19/14* (2010.01)
*G01S 19/42* (2010.01)

(52) U.S. Cl.
CPC .. *F05B 2270/329* (2013.01); *F05D 2270/804* (2013.01); *Y02E 10/72* (2013.01)

(58) Field of Classification Search
CPC . G01S 5/0027; G01S 2205/008; F03D 7/0212
USPC ........................................................ 342/357.4
See application file for complete search history.

(56) References Cited

U.S. PATENT DOCUMENTS

| | | | |
|---|---|---|---|
| 2011/0133455 A1 | 6/2011 | Altenschulte et al. | |
| 2011/0231038 A1* | 9/2011 | Studenny | G01S 19/20 701/17 |
| 2012/0263591 A1* | 10/2012 | Kwong | F03D 7/0204 416/9 |
| 2015/0136522 A1 | 5/2015 | Bergmann et al. | |
| 2016/0230746 A1* | 8/2016 | Dagher | F03D 13/25 |
| 2017/0037832 A1* | 2/2017 | Friedrich | B63B 21/50 |

FOREIGN PATENT DOCUMENTS

| | | |
|---|---|---|
| EP | 2063112 A2 | 5/2009 |
| EP | 2067913 A2 | 6/2009 |
| EP | 2202407 A2 | 6/2010 |
| EP | 2333316 A2 | 6/2011 |
| EP | 2617993 A2 | 7/2013 |
| JP | 2001509851 A | 7/2001 |
| JP | 2003084059 A | 3/2003 |
| JP | 2004285857 A | 10/2004 |
| JP | 2013148058 A | 8/2013 |
| KR | 1020140054680 A | 5/2014 |
| KR | 20150071141 A | 6/2015 |

* cited by examiner

METHOD FOR DETERMINING AN AZIMUTH ANGLE OF A WIND TURBINE

BACKGROUND

Technical Field

The invention relates to a method for determining an azimuth angle of a wind power installation. The invention also relates to a wind power installation having a tower, a nacelle and a rotor.

Description of the Related Art

In wind power installations, in particular during their installation and commissioning and when sizing prototype constellations, it is important to determine the azimuth angle of the wind power installation. The azimuth angle of a wind power installation is also referred to as the "installation viewing direction" and indicates, in degrees or angles, the compass direction in which the rotor hub or a spinner of the wind power installation points. In order to determine the azimuth angle, a bearing is taken of the wind power installation, usually the rotor hub or the spinner, from a distance using a compass bearing during commissioning of the wind power installation and the azimuth angle is derived therefrom.

In the priority application for the present application, the German Patent and Trademark Office searched the following prior art: DE 20 2007 008 066 U1, EP 2 333 316 A2 and KR 10 2014 0 054 680 A.

BRIEF SUMMARY

According to a first aspect, provided is a method for determining an azimuth angle of a wind power installation, having the steps of attaching at least two global navigation satellite system (GNSS) receivers to a nacelle of the wind power installation, comparing the reception signals of the GNSS receivers, deriving the azimuth angle from the comparison result. Provision is also made for the at least two GNSS receivers to be attached to a wind measuring supporting frame, in particular a wind meter.

The accuracy when determining the azimuth angle of a wind power installation can be increased by carrying out the method for determining the azimuth angle from the wind power installation, in particular from the nacelle, rather than conventionally remotely taking a bearing of the wind power installation. This also moreover applies to the second aspect, as described further below. The accuracy can be increased by attaching at least two GNSS receivers or, as described further below, a telescopic sight to the nacelle of the wind power installation and determining the azimuth angle on the basis of reception signals of the GNSS receivers or a bearing carried out by means of the telescopic sight since the positions of the GNSS receivers or of the telescopic sight on the nacelle of the wind power installation are known. With the methods according to the invention, a more accurate determination of the azimuth angle is not only be carried out during installation and commissioning and, for example, when sizing prototype constellations, but can also be used to correct or readjust the azimuth angle in existing wind power installations, for example.

It is important to accurately determine the azimuth angle of the wind power installation, in particular, when optimizing power curves of prototypes. The wind direction correction characteristic curves are designed in such a manner that the "installation viewing direction" points as directly as possible into the wind since less power would be drawn from the wind in the case of an oblique flow onto the wind power installation. Data relating to wind properties are usually determined in a wind power installation on a wind measuring supporting frame arranged on the nacelle, specifically usually using anemometers and anemoscopes for the wind speed and/or wind direction. So that the wind direction indicator or the anemoscope, in particular, does not provide any incorrect data relating to the wind direction, the wind direction indicator or the anemoscope is usually oriented on the nacelle in such a manner that the wind direction indicator points exactly in the installation viewing direction, that is to say the installation viewing direction of the wind power installation points directly into the wind. However, this applies only when the rotor of the wind power installation is not rotating. During operation of the wind power installation, the air flow swirled by the rotor blades results in the flow being influenced upstream of the wind direction indicator or anemoscope and the wind direction indicator or anemoscope is therefore not measuring the real wind direction. The intensity of this influence is dependent, inter alia, on the driven tip speed ratio. In order to compensate for this influence, a correction function which orients the wind power installation directly into the wind again is determined when optimizing the power curve, generally on prototypes. In this case, the wind direction determined at the wind measuring mast is used as a reference. The difference between the reference wind direction and the installation viewing direction (azimuth angle) results in the values of the correction function. This wind direction correction function is stored in the wind power installation controller and is a function of the tip speed ratio. The aim of the wind direction correction function is to optimize the power curve and the yield in kilowatt hours for the entire series of wind power installations. The wind direction correction function is generally determined in the trial phase of prototypes of wind power installations. In order to determine the wind direction correction function, the reference wind direction which is measured at the wind measuring mast and the azimuth angle must both be as accurate as possible. In particular, the azimuth angle, that is to say the installation viewing direction of the wind power installation, must correspond as accurately as possible to the real orientation of the wind power installation. An increase in the accuracy of the azimuth angle of the wind power installation can contribute to improving the wind direction correction function and can therefore also increase the wind yield by virtue of it being possible to improve the orientation of the wind power installation with respect to the wind. The wind direction correction function is subsequently implemented in the series controller of the wind power installations in a series.

Wind power installation manufacturers often use wind meters which are a combination of an anemometer and an anemoscope but are often referred to as anemometers for short (even though they also have the function of an anemoscope).

Even independently of the wind direction correction function, the exact determination of the azimuth angle of the wind power installation is very important, for example during the sectorial curtailment of the wind power installation. For example, the wind power installation can be operated with different operating parameters depending on the sector. If the wind blows from a particular sector, the wind power installation can be operated with reduced sound, for example, in order to shield residents. Furthermore, in a wind farm, the wind power installations positioned upstream can run in a throttled manner depending on the wind direction, as a result of which the turbulence and therefore the installation load are reduced, in particular, in order to allow the wind power installations positioned downstream "to see less turbulence". A more accurate determination of the azimuth angle therefore entails various advantages.

The abbreviation GNSS stands for Global Navigation Satellite System and is a collective term for the use of existing and future global satellite systems such as GPS (Global Positioning System), GLONASS (Global Navigation Satellite System), Galileo or Beidou and various (satellite-based) augmentation or supplementary systems which improve the position accuracy, for example DGPS (Differential Global Positioning System), RTK GPS (Real Time Kinematics Global Positioning System) or Satellite Based Augmentation Systems (SBAS). Regional navigation satellite systems (RNSS) are also understood as being concomitantly included in the term GNSS herein. In particular, the relative position between two receivers can by now be accurately determined to a few centimeters (cm) using systems such as DGPS/RTK GPS.

Comparing the reception signals of the at least two GNSS receivers makes it possible to derive the azimuth angle of the wind power installation from the comparison result. In particular, it is preferred for the two GNSS receivers to be attached to the nacelle at a known predetermined distance from one another, in which case a distance of more than 20 cm, in particular more than 50 cm, preferably at least 1 or 2 meters (m), is preferred.

The reception signals of the at least two GNSS receivers provide accurate data relating to the respective position of the at least two GNSS receivers. The angle between the two positions of the GNSS receivers and therefore the azimuth angle of the wind power installation can be determined from the two different reception signals.

It is preferably also possible to provide three or more GNSS receivers which can increase the reliability and/or measurement accuracy of the method. The at least two, three or more GNSS receivers are preferably temporarily and/or releasably mounted on the nacelle, but can alternatively also be permanently and/or non-releasably mounted on the nacelle. The at least two GNSS receivers can be attached to the nacelle of the wind power installation separately from one another as individual elements.

The reception signals can be compared and the azimuth angle can be derived from the comparison result as follows, for example. The angle of the receiver connecting axis with respect to the satellite can be determined from the distance between the two receivers and the phase shift of the different reception signals. The orientation of the connecting axis between the GNSS receivers with respect to north can therefore also be determined using the ephemerides of the satellite. The azimuth angle of the wind power installation can therefore also be determined using the known arrangement of the GNSS receivers on the nacelle of the wind power installation and therefore using the known position of the connecting axis between the GNSS receivers on the wind power installation. This makes it possible to achieve measurement accuracies in the range of a tenth to a hundredth of a degree. Deviations from the real azimuth angle of at most +/−2°, preferably of at most +/−1°, preferably occur with the method.

The two GNSS receivers are preferably oriented on the nacelle in such a manner that the connecting axis of the two GNSS receivers is oriented in a manner parallel to or identical to the installation viewing direction.

The at least two GNSS receivers are preferably attached to the wind measuring supporting frame, in particular the wind meter, by means of a holder. It is also preferred for the holder to be designed to releasably accommodate an orienting apparatus, in particular a laser device, for orienting the wind measuring supporting frame, in particular the wind meter. It is also preferred for the at least two GNSS receivers to be removed after determining the azimuth angle.

One preferred development provides for the at least two GNSS receivers to be part of a position determination apparatus attached to the nacelle, in particular a GNSS compass. It is preferred if the at least two GNSS receivers are structurally integrated in a position determination apparatus and are attached to the nacelle as part of this position determination apparatus.

The position determination apparatus may be, for example, in the form of a bar, preferably a telescopic bar. The at least two GNSS receivers can preferably be arranged at the two ends of the bar.

However, the position determination apparatus is preferably in the form of a GNSS compass which is also referred to as a GPS compass or satellite compass. A device which comprises at least two GNSS receivers, which can receive reception signals and can use them to determine an orientation of the receiver connecting axis or another reference axis of the GNSS compass, in particular an orientation with respect to north, is referred to as a GNSS compass, in particular.

In particular, it is preferred for the reception signals of the GNSS receivers to be compared in the position determination apparatus, in particular in the GNSS compass. It is also preferred for the azimuth angle to be derived in the position determination apparatus, in particular in the GNSS compass. A GNSS compass can comprise an evaluation unit and/or can be connectable to such an evaluation unit (in a wired and/or wireless manner).

Integrating the at least two GNSS receivers in a position determination apparatus, in particular in a GNSS compass, and preferably also comparing the reception signals of the GNSS receivers and/or deriving the azimuth angle in the position determination apparatus, in particular in the GNSS compass, have the advantage that only a single integral structural unit has to be attached to the nacelle of the wind power installation and possibly has to be connected or read (using signaling). In comparison with individually attaching at least two, possibly three or more, GNSS receivers, integrating the GNSS receivers in a position determination apparatus therefore considerably facilitates and simplifies the method and possibly the evaluation of the signals. The reliability of the method can also be increased in this manner and the susceptibility to faults can be reduced. Furthermore, the algorithms or calculation steps for deriving the azimuth angle in the position determination apparatus can also be easily and reliably changed or improved, if necessary, by means of a central software update in the position determination apparatus, for example.

According to a second aspect, provided is a method for determining an azimuth angle of a wind power installation, having the steps of attaching a telescopic sight to a nacelle of the wind power installation, taking a bearing of a bearing object at a bearing angle using the telescopic sight, deriving the azimuth angle from a comparison of the bearing angle with real coordinates of the bearing object and/or of the wind power installation, in particular of the telescopic sight. Provision is also made for the telescopic sight to be attached to a wind measuring supporting frame, in particular a wind meter.

As described above, this variant of the method is likewise based on the knowledge that the accuracy can be increased by carrying out the method from the wind power installation, in particular from the nacelle. In this variant of the method, a telescopic sight is preferably temporarily and/or releasably mounted on the nacelle and a bearing is taken of a bearing object using the telescopic sight. The real coordinates of the bearing object are preferably known or were previously measured or determined in another manner. The angle between the installation orientation and the telescopic sight/bearing object extension is the bearing angle. The azimuth angle of the wind power installation can be derived from this bearing angle and the real coordinates of the bearing object and from the real coordinates of the wind power installation, that is to say the location of the wind power installation, in particular the real coordinates of the telescopic sight. The bearing angle between the straight line between the wind power installation or the position of the telescopic sight and the bearing object and the north axis can be determined by means of a vector calculation, for example.

If the method is intended to be used to correct an azimuth angle of a wind power installation, the step of deriving the azimuth angle can also be carried out and/or modified as follows. The bearing angle can be added to or subtracted from the existing azimuth angle of the installation to be corrected and the resulting angle is referred to as angle A. The angle between the installation orientation and the north axis, which results or is calculated from the real coordinates of the bearing object and the wind power installation or the telescopic sight, is referred to as angle B. A so-called offset of the azimuth angle of the wind power installation, by which the existing azimuth angle of the wind power installation is to be corrected, results from the difference between these two angles A and B.

According to a third aspect, provided is a method for determining an azimuth angle of a wind power installation, having the steps of: attaching a GNSS receiver to a nacelle of the wind power installation, rotating the nacelle of the wind power installation about its own axis and comparing the reception signals of the GNSS receiver from different positions of the rotation, deriving the azimuth angle from the comparison result. Provision is also made for the at least one GNSS receiver to be attached to a wind measuring supporting frame, in particular a wind meter.

Like the first two aspects, this variant of the method is likewise also based on the knowledge that the accuracy can be increased by carrying out the method from the wind power installation, in particular from the nacelle. In this variant of the method, only one GNSS receiver is required (but two, three or more receivers can also be used). In order to determine the azimuth angle, the nacelle with the GNSS receiver, which is attached thereto, preferably at a fixed position which is known with respect to the center axis and the pivot point, is rotated, preferably about a vertical axis and also preferably through a full 360 degrees. During this rotation of the nacelle, the GNSS receiver receives reception signals preferably continuously, but at least at intervals of time or in angular spacings, from which reception signals the coordinates can be derived. The azimuth angle can be determined by comparing these data obtained at different positions of the rotation.

It is preferred, in particular, for the GNSS receiver to be attached outside the pivot point of the nacelle on a substantially horizontal longitudinal axis of the nacelle and for the process of deriving the azimuth angle to comprise orienting the nacelle according to the northernmost coordinate of those coordinates which have been determined from the reception signals of the GNSS receiver received during the rotation. This makes it possible to orient the installation viewing direction to the north in a particularly simple manner.

According to another preferred development, the method, in particular the method according to the first and/or second and/or third aspect, can be developed by virtue of the at least one GNSS receiver, preferably the at least two GNSS receivers, in particular the position determination apparatus, and/or the telescopic sight being attached to a wind measuring supporting frame, in particular a wind meter.

As an alternative or in addition to being attached to the nacelle of the wind power installation, the at least one GNSS receiver, preferably the at least two GNSS receivers, in particular the position determination apparatus, and/or the telescopic sight can be attached to a wind measuring supporting frame, in particular a wind meter. A wind meter is generally arranged on the nacelle of the wind power installation, for example on a wind measuring supporting frame. The attaching to a nacelle of the wind power installation comprises attaching to a wind measuring supporting frame. The attaching to a nacelle of the wind power installation therefore also comprises attaching to a wind meter which is generally arranged on a wind measuring supporting frame on the nacelle. The wind meter can be, for example, an anemometer for determining the wind speed or an anemoscope or a wind direction indicator for determining the wind direction. Ultrasonic anemoscopes and/or ultrasonic anemometers can preferably be used, in particular.

According to one preferred development of the method, provision is made for the at least one GNSS receiver, preferably the at least two GNSS receivers, in particular the position determination apparatus, and/or the telescopic sight to be attached to the wind measuring supporting frame, in particular the wind meter, by means of a holder. It is also preferred for the holder to be designed to releasably accommodate an orienting apparatus, in particular a laser device, for orienting the wind meter.

The orienting apparatus may be, for example, a laser device. For example, provision may be made for the wind meter to be oriented relative to the nacelle by means of an orienting apparatus which is releasably fastened to the wind meter by means of a holder. It is therefore particularly advantageous if the same holder can be used to attach the at least one GNSS receiver, preferably the at least two GNSS receivers, in particular the position determination apparatus, and/or the telescopic sight to the wind meter, preferably likewise in a releasable manner. This makes it possible, on the one hand, to reuse the holder and, on the other hand, to select a simple fitting which protects the wind meter using this holder.

According to one particularly advantageous embodiment, it is preferred for the at least one GNSS receiver, preferably the at least two GNSS receivers, in particular the position determination apparatus, and/or the telescopic sight to be removed after determining the azimuth angle.

In this development, provision is made for the at least one GNSS receiver, preferably the at least two GNSS receivers, in particular the position determination apparatus, and/or the telescopic sight to be only temporarily and/or releasably mounted on the nacelle, in particular on the wind meter. This has several advantages. On the one hand, this is a particularly cost-effective variant since the at least two GNSS receivers, in particular the position determination apparatus, and/or the telescopic sight can be used for a multiplicity of wind power installations, the azimuth angles of which are determined or ascertained in succession, and which therefore do not need to remain on a wind power installation over the service life of the latter. Even if it is necessary to check and/or correct the azimuth angle during the service life of a wind power installation, the at least two GNSS receivers, in particular the position determination apparatus, and/or the telescopic sight can be attached to the nacelle, in particular the wind meter, (again) for this check or correction and the azimuth angle can be determined (again). Furthermore, it is generally necessary to determine the azimuth angle for the wind direction correction function only for a prototype and/or a small number of individual wind power installations in a wind power installation series and not for the entire series.

Alternatively, provision may also be made for the at least one GNSS receiver, preferably the at least two GNSS receivers, in particular the position determination apparatus, and/or the telescopic sight to be mounted on the nacelle, in particular on the wind meter, in a permanent and/or non-releasable manner.

According to another aspect, the object mentioned at the outset is achieved by means of a wind power installation having a tower, a nacelle and a rotor, characterized in that at least one GNSS receiver, preferably at least two GNSS receivers, in particular a position determination apparatus, and/or a telescopic sight, is/are arranged on the nacelle, namely on a wind measuring supporting frame, in particular a wind meter, for determining the azimuth angle.

The wind power installation and its possible developments have features which make it suitable, in particular, for carrying out an above-described method in accordance with the various aspects and their various developments.

With respect to the advantages, embodiment variants and embodiment details of the wind power installation and its possible developments, reference is made to the preceding description of the corresponding method features.

According to another aspect, provided is use of at least one GNSS receiver, preferably at least two GNSS receivers, in particular a position determination apparatus, and/or a telescopic sight on a wind power installation to determine an azimuth angle at a wind measuring supporting frame, in particular a wind meter.

With respect to the advantages, embodiment variants and embodiment details of this further aspect and its possible developments, reference is likewise made to the preceding description of the corresponding method features.

BRIEF DESCRIPTION OF THE SEVERAL VIEWS OF THE DRAWINGS

Preferred embodiments of the invention are described by way of example on the basis of the accompanying figures, in which.

DETAILED DESCRIPTION

Figure 1:
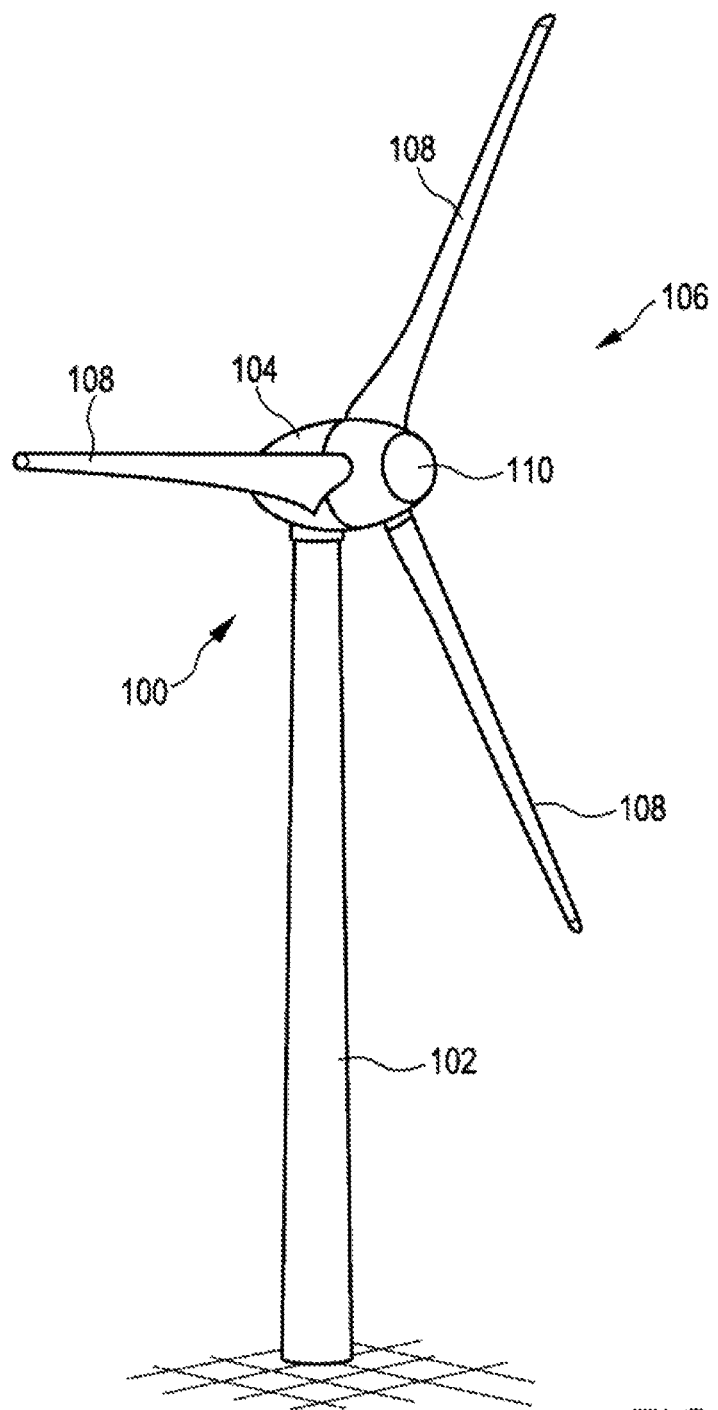
FIG. 1 shows an exemplary embodiment of a wind power installation according to the invention.

FIG. 1 shows a wind power installation 100 having a tower 102 and a nacelle 104. A rotor 106 having three rotor blades 108 and a spinner 110 is arranged on the nacelle 104. During operation, the rotor 106 is caused to rotate by the wind and thereby drives a generator in the nacelle 104.

Figure 7:
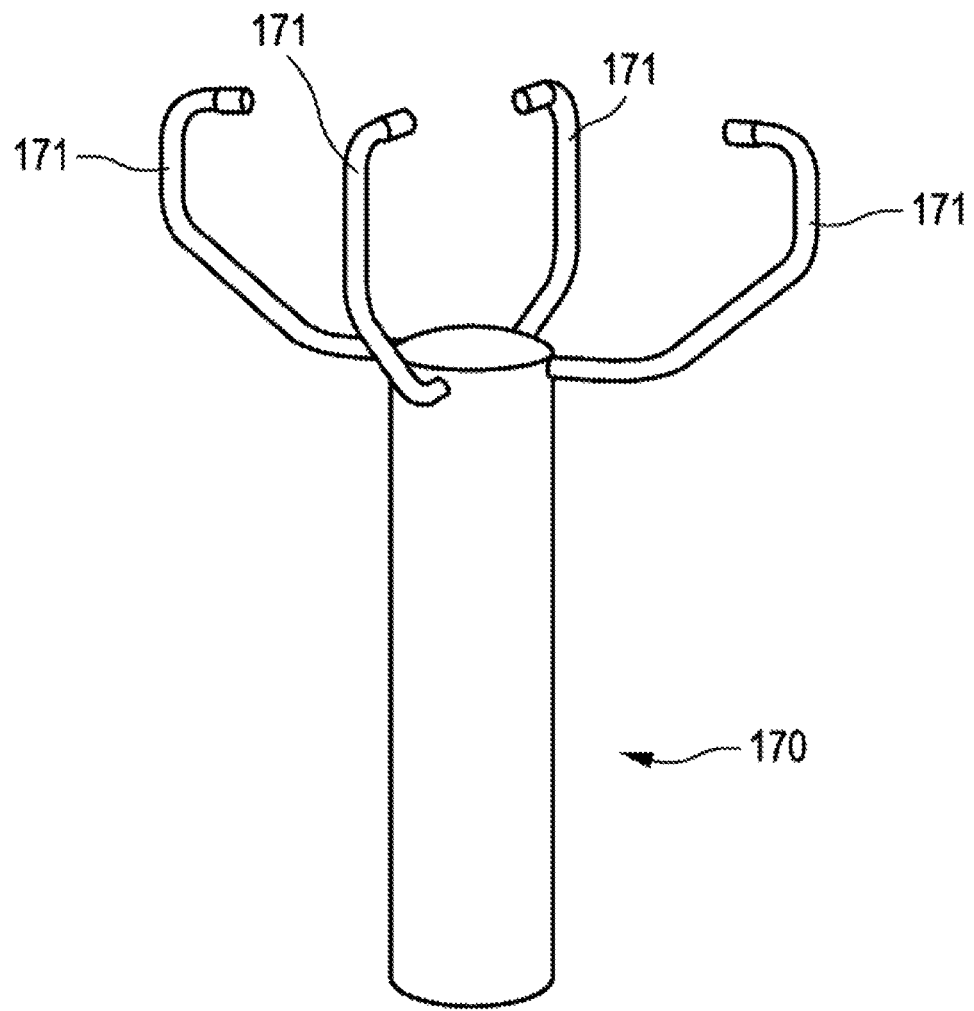
FIG. 7 shows a three-dimensional view of an ultrasonic wind meter.

The compass direction in which the spinner 110 is oriented is referred to as the azimuth angle or viewing direction of the wind power installation 100. So that the nacelle 104 and, with the latter, the rotor 106 are always oriented in the wind direction as much as possible, that is to say the spinner 110 and therefore the installation viewing direction point directly into the wind, a wind measuring supporting frame 160 (see FIG. 11), on which an ultrasonic wind meter 170 (see FIGS. 7 and 11) which is in the form of a combined anemometer and anemoscope and here has four arms 171 is arranged, is usually arranged on the nacelle 104.

Figure 2:
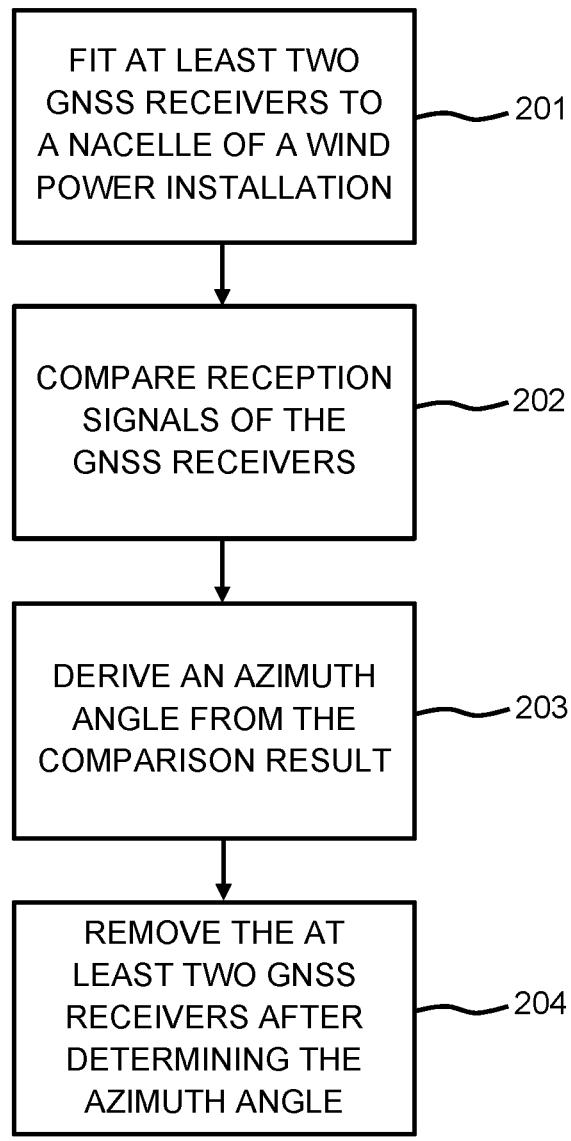
FIG. 2 shows an exemplary embodiment of a method according to the invention.

In order to increase the accuracy when determining the azimuth angle which is important both for determining the wind direction correction function and for the sectorial curtailment of the wind power installation 100, the methods according to FIGS. 2 and/or 3 are preferred, for example.

According to FIG. 2, an exemplary method for determining an azimuth angle of a wind power installation comprises step 201: attaching at least two GNSS receivers to a nacelle of the wind power installation, step 202: comparing the reception signals of the GNSS receivers, step 203: deriving the azimuth angle from the comparison result, and preferably optional step 204: removing the at least two GNSS receivers after determining the azimuth angle.

Figure 3A:
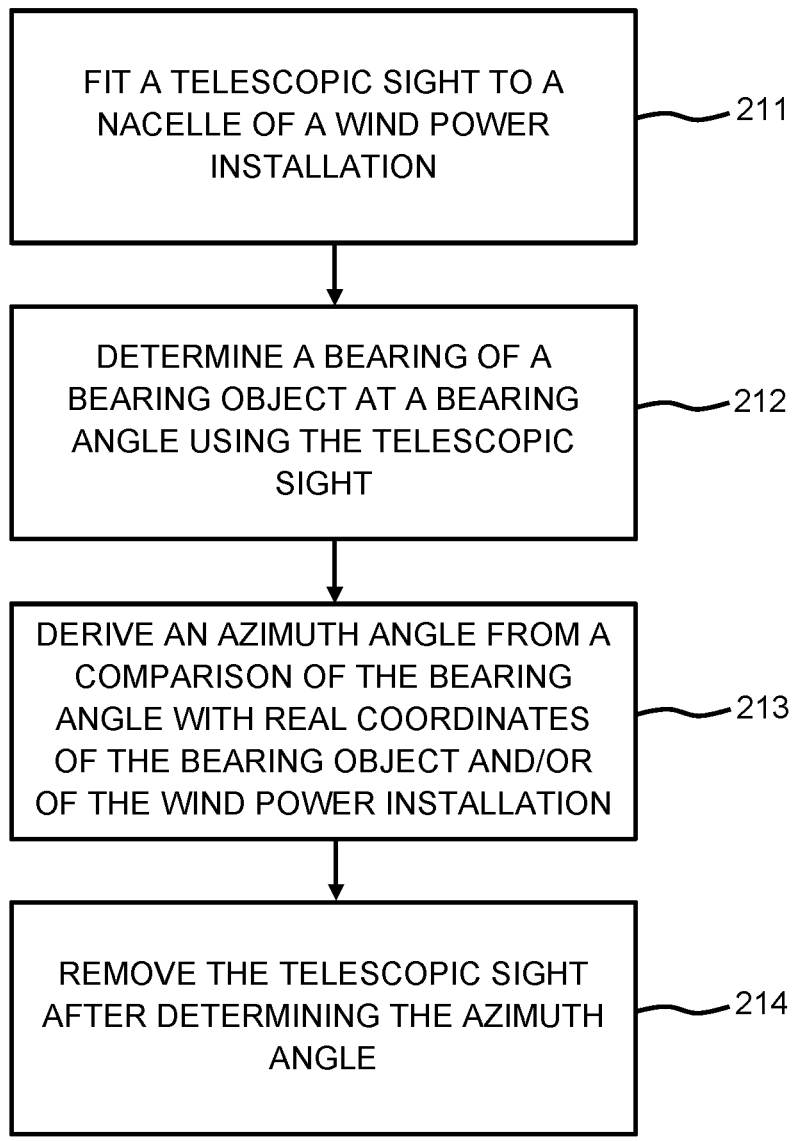
FIG. 3a shows a further exemplary embodiment of a method according to the invention.

According to FIG. 3a, an exemplary method for determining an azimuth angle of a wind power installation comprises step 211: attaching a telescopic sight to a nacelle of the wind power installation, step 212: determining a bearing of a bearing object at a bearing angle using the telescopic sight, step 213: deriving the azimuth angle from a comparison of the bearing angle with real coordinates of the bearing object and/or of the wind power installation, in particular of the telescopic sight, and preferably optional step 214: removing the telescopic sight after determining the azimuth angle.

Figure 3B:
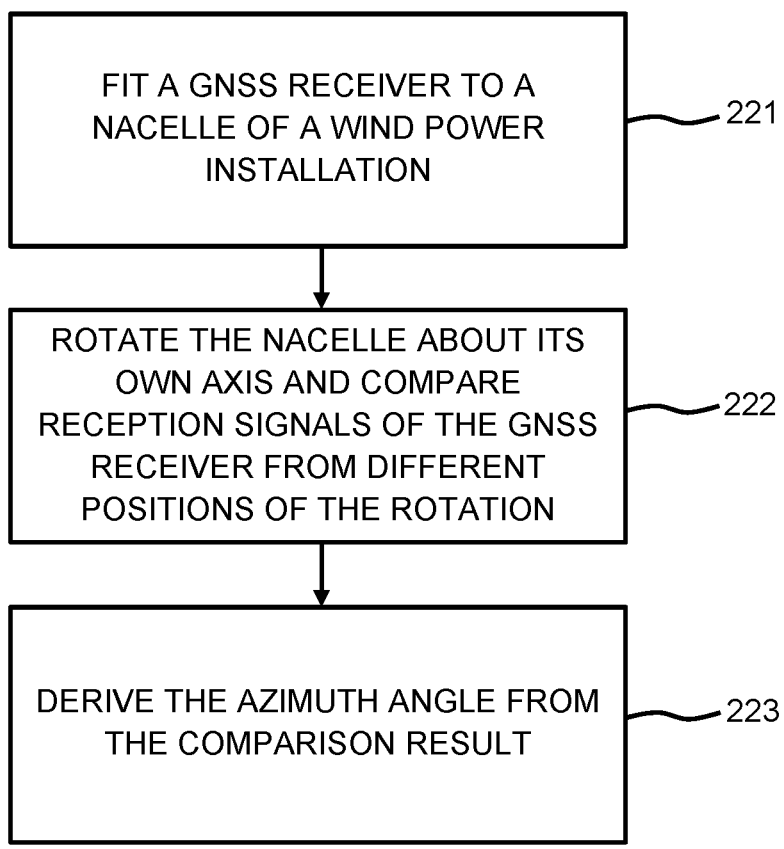
FIG. 3b shows a third exemplary embodiment of a method according to the invention.

According to FIG. 3b, an exemplary method for determining an azimuth angle of a wind power installation comprises step 221: attaching a GNSS receiver to a nacelle of the wind power installation, 222: rotating the nacelle of the wind power installation about its own axis and comparing the reception signals of the GNSS receiver from different positions of the rotation, and 223: deriving the azimuth angle from the comparison result, in which case the GNSS receiver is preferably attached outside the pivot point of the nacelle on a substantially horizontal longitudinal axis of the nacelle, and the process of deriving the azimuth angle comprises orienting the nacelle according to the northern-most coordinate of those coordinates determined from the reception signals of the GNSS receiver received during the rotation.

Figure 9:
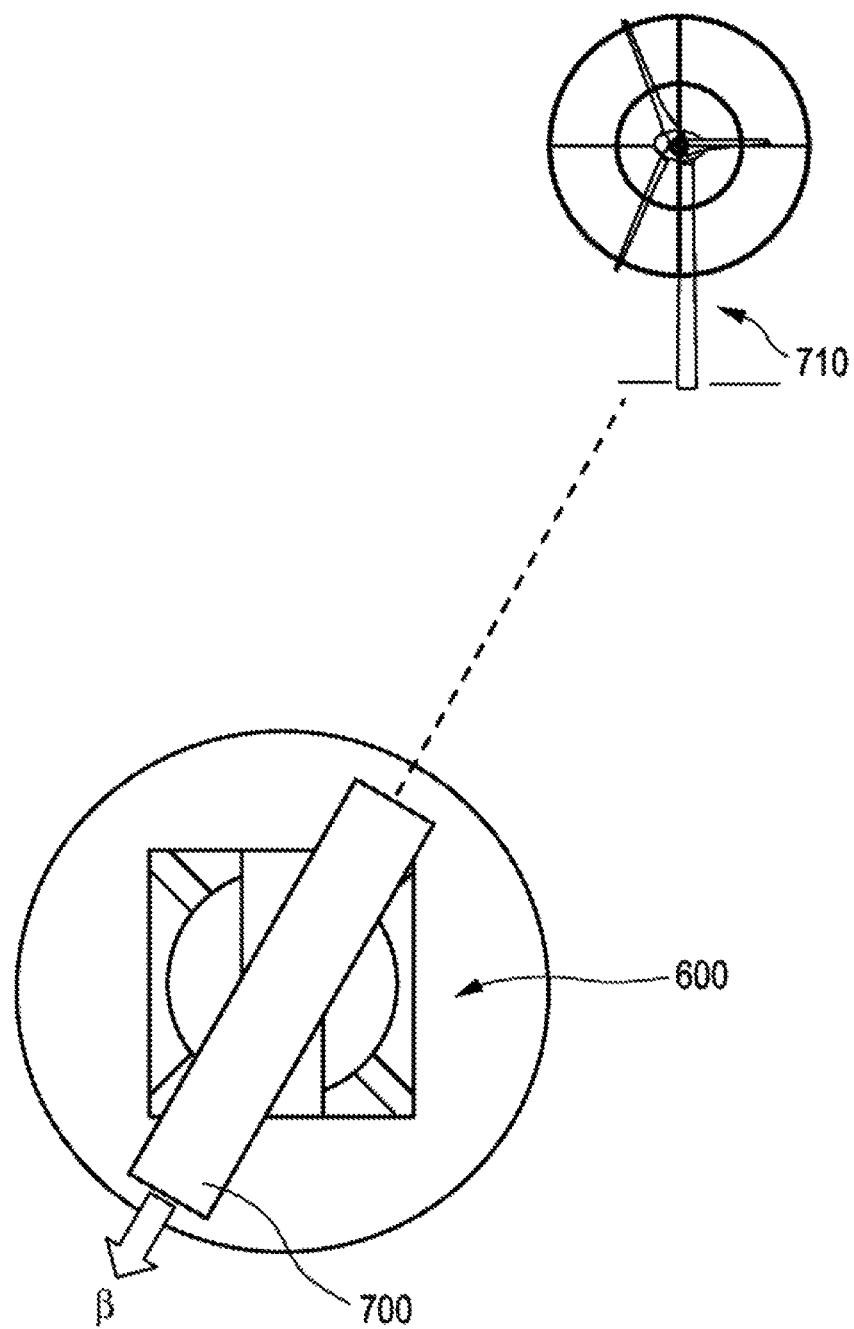
FIG. 9 shows a schematic illustration of the bearing operation according to the method shown in FIG. 3.

FIG. 9 illustrates the step of determining a bearing, denoted 212 in FIG. 3, in more detail. FIG. 9 schematically illustrates that a telescopic sight 700 is releasably arranged on a holder 600 (described in more detail below) and is used to take a bearing of a remotely positioned bearing object, here another wind power installation 710, at a bearing angle α.

Figure 10:
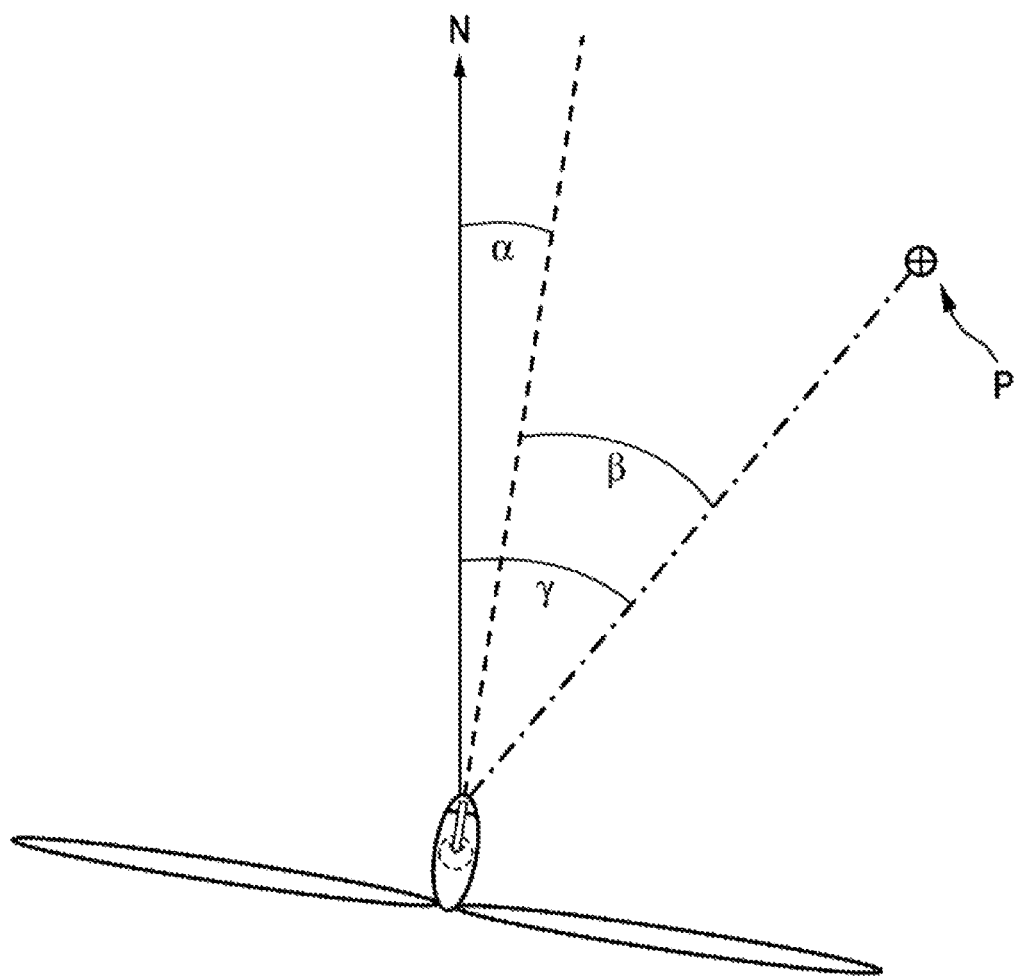
FIG. 10 shows a further schematic illustration of a bearing operation.

FIG. 10 illustrates the operation of determining a bearing of a wind power installation 100 with respect to a bearing object P. The telescopic sight is not illustrated in FIG. 10. The angle between the installation orientation and the telescopic sight/bearing object extension is the bearing angle β. The azimuth angle of the wind power installation can be derived from this bearing angle β and the real coordinates of the bearing object and the real coordinates of the wind power installation, that is to say the location of the wind power installation, in particular the real coordinates of the telescopic sight.

If the method is intended to be used to correct an azimuth angle of a wind power installation, the step of deriving the azimuth angle can also be carried out and/or modified as follows. The bearing angle β can be added to or subtracted from the existing azimuth angle α of the installation to be corrected and the resulting angle is referred to as angle A. The angle between the installation orientation and the north axis N, which results or is calculated from the real coordinates of the bearing object and the wind power installation or the telescopic sight, is referred to as angle B (γ). A so-called offset of the azimuth angle of the wind power installation, by which the existing azimuth angle of the wind power installation is to be corrected, results from the difference between these two angles A and B.

Figure 4:
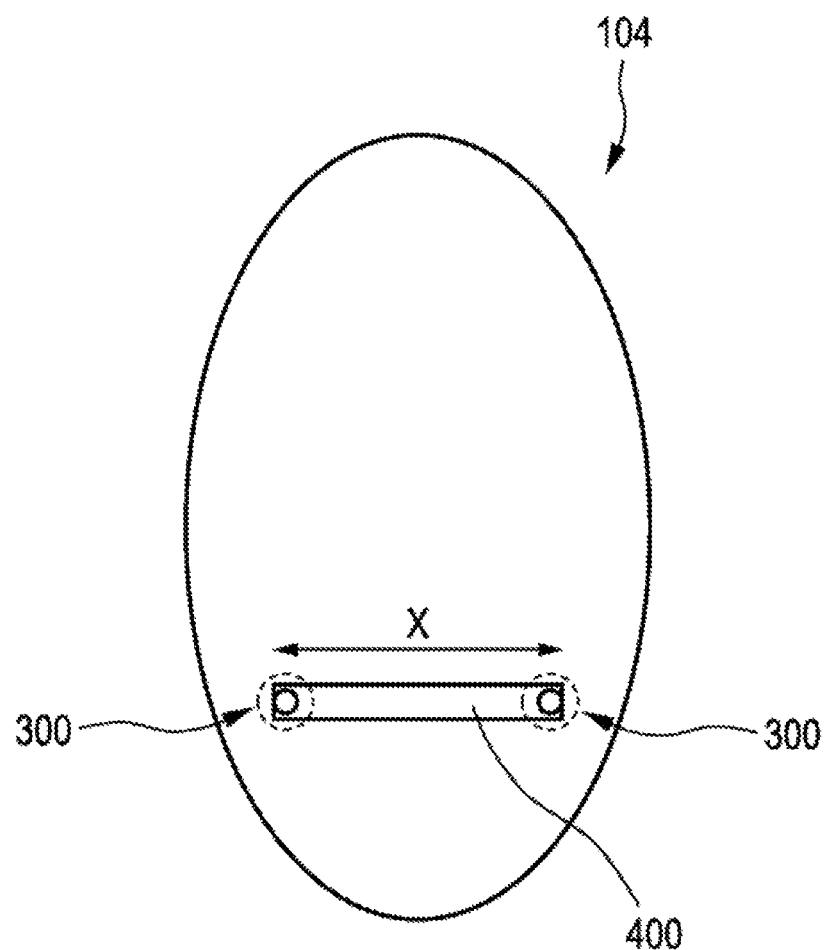
FIG. 4 shows a schematic illustration of a nacelle of a wind power installation with a position determination apparatus attached thereto.
Figure 5:
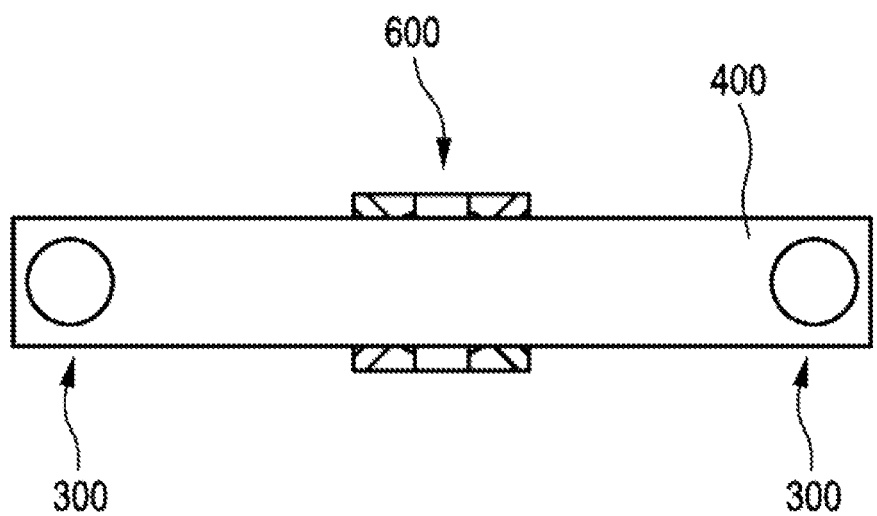
FIG. 5 shows a plan view of a first exemplary embodiment of a position determination apparatus.

As can be seen in FIG. 4, the at least two GNSS receivers 300 may be part of a position determination apparatus which is attached to the nacelle 104 and is in the form of a bar 400. The distance between the two GNSS receivers 300, which is denoted X, is preferably approximately two meters. As illustrated in FIGS. 4 and 5, the position determination apparatus may be in the form of a simple bar 400, at the respective ends of which the at least two GNSS receivers 300 are arranged. The position determination apparatus is preferably in the form of a telescopic bar. It can also be seen in FIG. 5 that the position determination apparatus 400 is releasably fastened to a holder 600 (described in more detail below).

Figure 6:
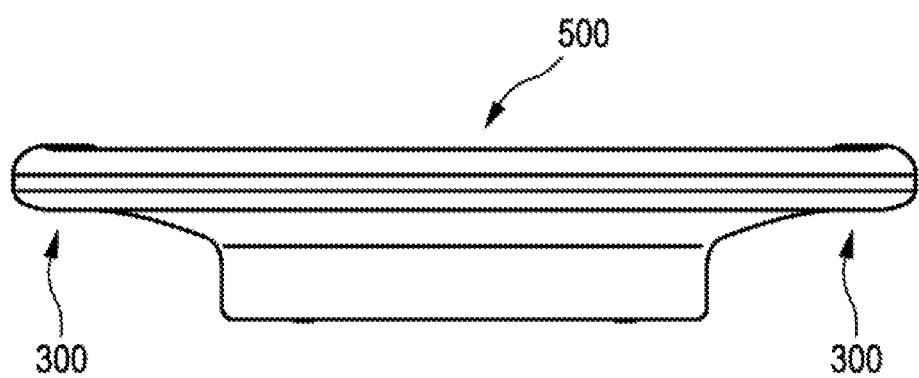
FIG. 6 shows a side view of a second exemplary embodiment of a position determination apparatus.

FIG. 6 illustrates that the two GNSS receivers 300 may also be part of a position determination apparatus in the form of a GNSS compass 500 or satellite compass. Such a GNSS compass 500 may likewise be attached to the nacelle or to a wind measuring supporting frame of the wind power installation. The two GNSS receivers are preferably likewise arranged at ends of the GNSS compass 500 which are spaced as far away from one another as possible.

Figure 8:
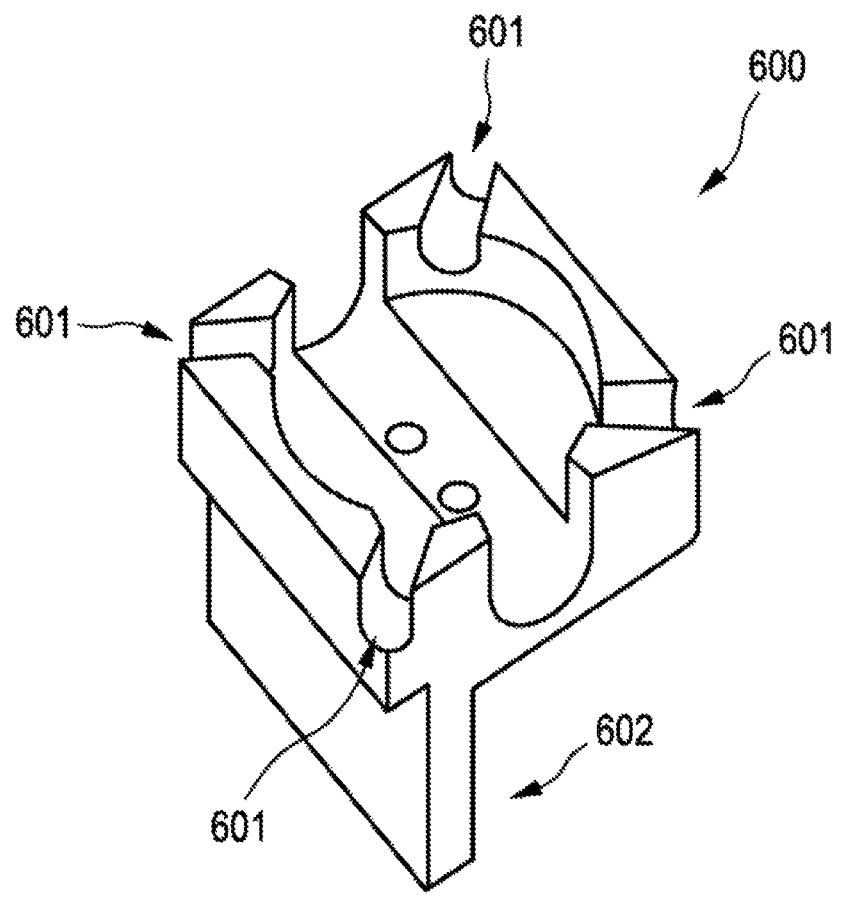
FIG. 8 shows a three-dimensional view of a holder for use with a wind meter, in particular with a wind meter according to FIG. 7.
Figure 11:
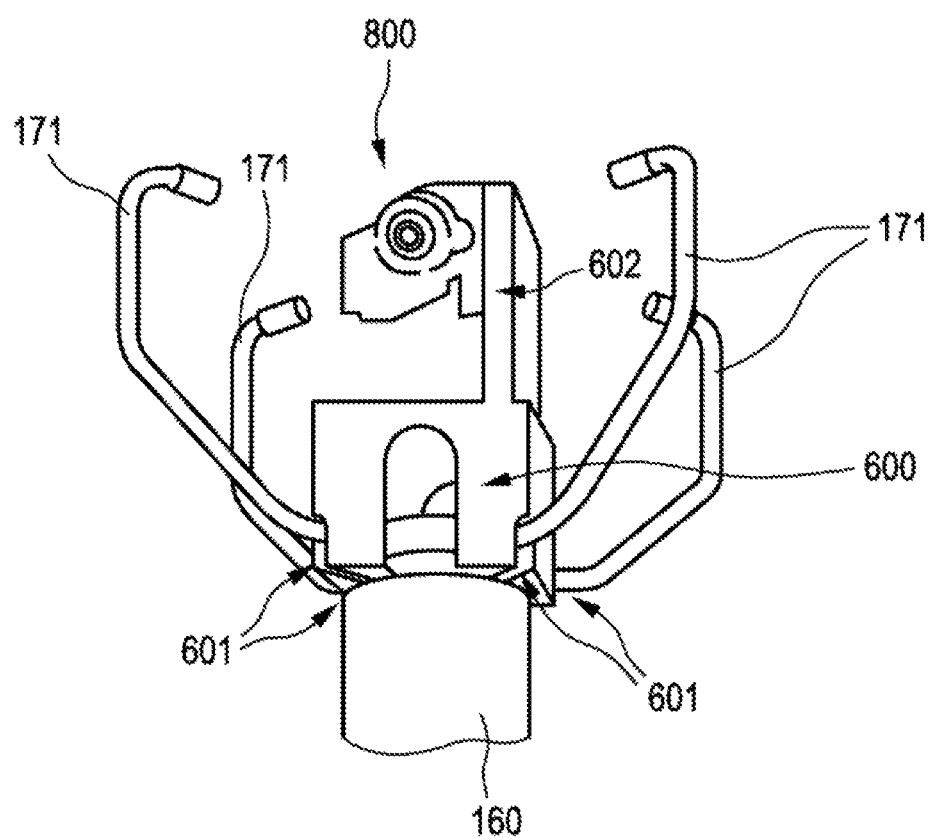
FIG. 11 shows a three-dimensional view of a wind measuring supporting frame with an ultrasonic wind meter arranged thereon and with a holder which is arranged thereon and has an orienting apparatus.

As can be seen in FIG. 11, a holder 600 (also illustrated again in FIG. 8) can be attached to the wind meter 170 attached to the wind measuring supporting frame 160. On its underside, the holder 600 has four recesses 601, into which the four arms 171 of the wind meter 170 can engage. The holder 600 also has a projecting holding plate 602 on which an orienting apparatus can be releasably arranged. As illustrated in FIG. 11, a laser device 800, for example, can be releasably fastened to the projecting holding plate 602. The orienting apparatus in the form of a laser device 800 can be used, for example, to orient the wind meter 170 on the wind measuring supporting frame 160 exactly in the installation viewing direction. The holder 600, in particular the projecting holding plate 602, can also be used, after removing the orienting apparatus, to fasten the at least two GNSS receivers, in particular the position determination apparatus, and/or the telescopic sight to the wind meter, for example the wind meter 170 or the wind measuring supporting frame 160.

Figure 12:
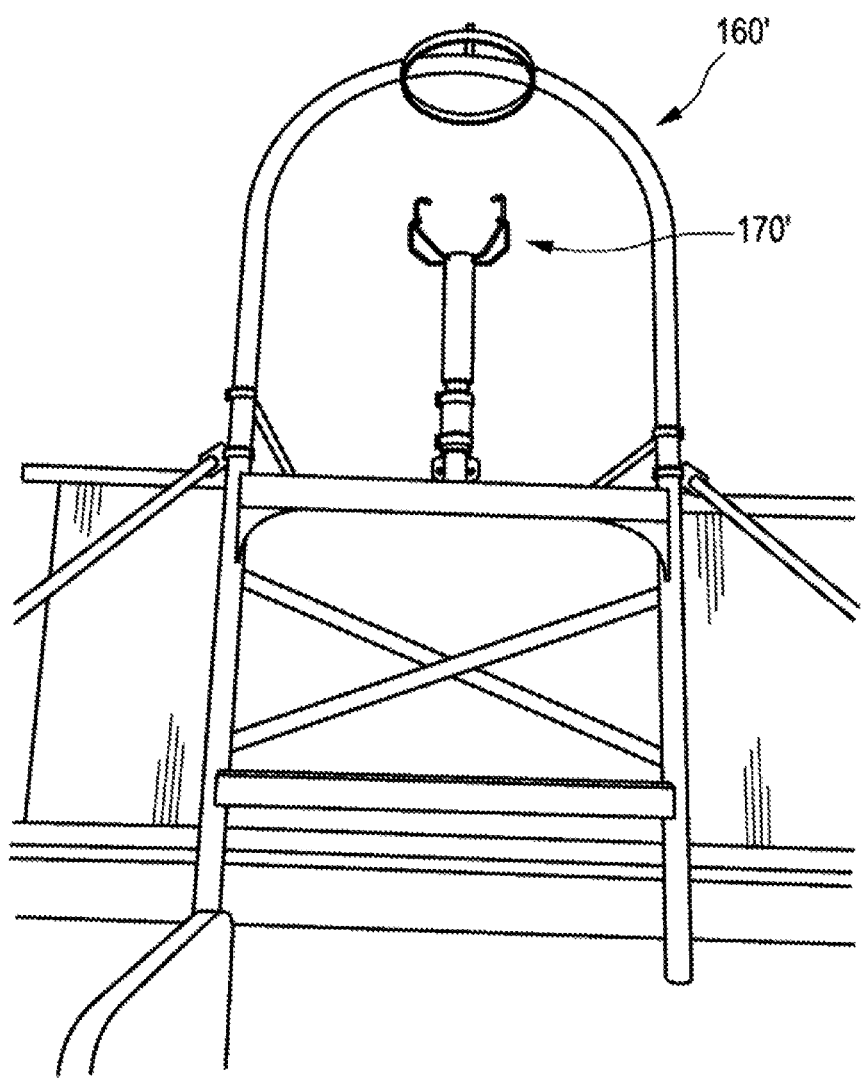
FIG. 12 shows a three-dimensional view of a further embodiment of a wind measuring supporting frame with an ultrasonic wind meter arranged thereon.

FIG. 12 illustrates another embodiment of a wind measuring supporting frame 160' with an ultrasonic wind meter 170' arranged thereon.

The inventive concept of shifting the determination of the azimuth angle to the wind power installation 100 itself, and thereby considerably increasing the accuracy when determining the azimuth angle in comparison with conventional methods in which the azimuth angle of a wind power installation is determined by remotely taking a bearing, therefore entails various advantages. On the one hand, the wind yield can be increased by optimizing the wind direction correction function. On the other hand, the noise pollution and, in particular, the turbulence load and therefore the material load of the installations can be reduced by sectorially curtailing the wind power installation and the wind yield can likewise be increased in wind farms. As a result of the fact that the elements used to determine the azimuth angle can be released and reused, the method can also be carried out in an efficient and cost-effective manner.

The invention claimed is:

1. A method for determining an azimuth angle of a wind power installation, the method comprising:
    attaching, using a holder, at least two global navigation satellite system (GNSS) receivers to a wind measuring supporting frame of a nacelle of the wind power installation,
    receiving reception signals at the at least two GNSS receivers, respectively,
    comparing the reception signals of the at least two GNSS receivers, and
    deriving the azimuth angle from comparing the reception signals of the least two GNSS receivers.

2. The method as claimed in claim 1, wherein the holder releasably accommodates an orienting apparatus for orienting the wind measuring supporting frame.

3. The method as claimed in claim 2, wherein the orienting apparatus is a laser device.

4. The method as claimed in claim 1, comprising:
    removing the at least two GNSS receivers after determining the azimuth angle.

5. The method as claimed in claim 1, wherein the at least two GNSS receivers are part of a GNSS compass that is a position determination apparatus.

6. The method as claimed in claim 5, comprising:
    comparing, by the GNSS compass, the reception signals of the at least two GNSS receivers.

7. The method as claimed in claim 5, comprising:
    deriving, by the GNSS compass, the azimuth angle.

8. The method as claimed in claim 1, comprising:
    attaching the at least two GNSS receivers to a wind meter of the nacelle of the wind power installation.

9. The method as claimed in claim 8, wherein the holder releasably accommodates an orienting apparatus for orienting the wind meter.

10. The method as claimed in claim 9, wherein the orienting apparatus is a laser device.

11. A method for determining an azimuth angle of a wind power installation, the method comprising:
attaching, using a holder, a global navigation satellite system (GNSS) receiver to a wind measuring supporting frame of a nacelle of the wind power installation,
rotating the nacelle of the wind power installation about its axis,
receiving, at different positions during the rotation, respective reception signals of the GNSS receiver,
comparing the reception signals of the GNSS receiver obtained at the different positions in the rotation, and
deriving the azimuth angle from comparing the reception signals of the GNSS receiver obtained at the different positions in the rotation.

12. The method as claimed in claim 11, comprising:
attaching the GNSS receiver outside a pivot point of the nacelle on a substantially horizontal longitudinal axis of the nacelle, and
deriving the azimuth angle by:
orienting the nacelle to a northernmost coordinate of coordinates determined from the reception signals of the GNSS receiver received during the rotation.

13. A wind power installation, comprising:
a tower,
a nacelle,
a rotor,
a wind measuring supporting frame mounted on the nacelle, and
a position determination apparatus having at least one GNSS receiver mounted, using a holder, on the wind measuring supporting frame for determining an azimuth angle.

* * * * *